United States Patent
Raiser et al.

(10) Patent No.: US 10,355,330 B2
(45) Date of Patent: Jul. 16, 2019

(54) BATTERY MODULE ASSEMBLY AND COOLING PLATE FOR USE IN A BATTERY MODULE ASSEMBLY

(71) Applicant: AKASOL GMBH, Darmstadt (DE)

(72) Inventors: Stephen Raiser, Wiesbaden (DE); Kai Rittner, Riedstadt (DE)

(73) Assignee: AKASOL GMBH, Darmstadt (DE)

( * ) Notice: Subject to any disclaimer, the term of this patent is extended or adjusted under 35 U.S.C. 154(b) by 0 days.

(21) Appl. No.: 15/690,677

(22) Filed: Aug. 30, 2017

(65) Prior Publication Data

US 2018/0062226 A1 Mar. 1, 2018

(30) Foreign Application Priority Data

Aug. 31, 2016 (EP) ...................................... 16186546

(51) Int. Cl.
 *H01M 10/6554* (2014.01)
 *H01M 10/613* (2014.01)
 (Continued)

(52) U.S. Cl.
 CPC ..... *H01M 10/6554* (2015.04); *H01M 2/1077* (2013.01); *H01M 10/613* (2015.04);
 (Continued)

(58) Field of Classification Search
 CPC ........... H01M 10/6554; H01M 10/658; H01M 10/6556; H01M 10/613; H01M 2/1077;
 (Continued)

(56) References Cited

U.S. PATENT DOCUMENTS

| 2011/0104547 A1* | 5/2011 | Saito | H01M 2/1077 429/120 |
| 2011/0162820 A1 | 7/2011 | Weber et al. | |

(Continued)

FOREIGN PATENT DOCUMENTS

| DE | 102009052508 A1 | 5/2011 |
| DE | 102009058861 A1 | 6/2011 |

(Continued)

OTHER PUBLICATIONS

Article: Smart Battery Thermal Management for PHEV Efficiency; vol. 68 (2013), No. 1, pp. 149-164.

*Primary Examiner* — Gary D Harris
(74) *Attorney, Agent, or Firm* — Vivacqua Law, PLLC (57) ABSTRACT

A battery module assembly comprising a plurality of battery modules each comprising battery cells, with the battery modules being arranged at respective positions in at least one row and respectively having a top side at which electric contacts are provided in order to connect the plurality of battery modules to form a power supply and a bottom side, the battery module assembly further comprising a housing and a cooling plate arranged between the housing and the bottom sides of the plurality of battery modules, wherein the cooling plate comprises a plurality of separate cooling passages, wherein a heat conducting gap filling material is preferably provided directly between the bottom sides of the plurality of battery modules and the cooling plate. The invention further relates to a cooling plate for use in such a housing.

20 Claims, 7 Drawing Sheets

(51) Int. Cl.
*H01M 10/625* (2014.01)
*H01M 2/10* (2006.01)
*H01M 10/6556* (2014.01)
*H01M 10/658* (2014.01)
*H01M 10/647* (2014.01)
*H01M 10/6566* (2014.01)

(52) U.S. Cl.
CPC ....... *H01M 10/625* (2015.04); *H01M 10/658* (2015.04); *H01M 10/6556* (2015.04); *H01M 10/647* (2015.04); *H01M 10/6566* (2015.04); *H01M 2220/20* (2013.01)

(58) Field of Classification Search
CPC ........... H01M 10/625; H01M 10/6566; H01M 10/647; H01M 2220/20
USPC ........................................................ 429/120
See application file for complete search history.

(56) References Cited

U.S. PATENT DOCUMENTS

| | | |
|---|---|---|
| 2012/0003508 A1 | 1/2012 | Narbonne et al. |
| 2012/0219839 A1 | 8/2012 | Kritzer et al. |
| 2013/0157099 A1 | 6/2013 | Anderson |
| 2014/0193686 A1 | 7/2014 | Siering |

FOREIGN PATENT DOCUMENTS

| | | |
|---|---|---|
| DE | 102010009478 A1 | 9/2011 |
| DE | 102011052513 A1 | 2/2013 |
| EP | 2403050 A1 | 1/2012 |
| JP | 2003303579 A1 | 10/2003 |
| KR | 20140145250 A | 12/2014 |
| KR | 20160101382 A | 8/2016 |
| WO | 2010121829 A1 | 10/2010 |
| WO | 2010121831 A1 | 10/2010 |
| WO | 2011101391 A1 | 8/2011 |
| WO | 2012028298 A2 | 3/2012 |
| WO | 2013156554 A1 | 10/2013 |
| WO | 2015086669 A1 | 6/2016 |

* cited by examiner

BATTERY MODULE ASSEMBLY AND COOLING PLATE FOR USE IN A BATTERY MODULE ASSEMBLY

CROSS-REFERENCE TO RELATED APPLICATIONS

This application claims priority to European Patent Application No. 16186546.4 filed on Aug. 31, 2016. The disclosure of the above application is incorporated herein by reference.

INTRODUCTION

The present invention relates to a battery module assembly comprising a plurality of battery modules each comprising battery cells, with the battery modules being arranged at respective positions in at least one row and respectively having a top side at which electric contacts are provided in order to connect the plurality of battery modules to form a power supply. The invention further relates to a cooling plate for use in such a battery module assembly.

A battery module assembly or system which is assembled from a plurality of like battery modules can, for example, be designed in order to cover a power range having a content of energy of between 1 kWh and 400 kWh or more. When, for example, a battery module system is designed for a continuous power of 20 kW, peak powers of, for example, 100 kW can still be required from the battery for acceleration purposes on a short term basis, whereby excellent acceleration values can be achieved. One can work with a charging power of 40 kW, for example, during charging operations.

The above stated values are purely exemplary; but generally represent values which can be achieved with commercially available lithium ion batteries.

In order to ensure a safe operation of the battery modules during use e.g. in a motor vehicle, or for a stationary battery module, the battery modules have to be installed in a housing that is adapted to protect the battery modules from external influences, such as rain, vibrations etc. that arise from the environment of use of the battery modules.

Battery module assemblies housing such battery modules either comprise battery modules that are directly and actively cooled, such as the ones disclosed in WO2015/086669 A3. The housings for such battery modules then only need to include the hoses etc. required to connect the cooling lines of the respective modules to one another for the purpose of cooling, but generally do not require any further cooling means.

Alternatively battery modules are available that do not themselves have an active cooling associated therewith. However, in order to ensure a reliable and efficient cooling of such non-actively cooled battery modules, the battery module assembly requires the provision of the hoses and further cooling elements in order to actively cool the battery modules.

For this reason it is an object of the present invention to provide a battery module assembly comprising a plurality of battery modules that can be actively cooled within the battery module assembly. It is a further object of the invention that the battery module assembly can be manufactured in a simple manner and modular manner and cost effectively that furthermore permits repairs to one or more of the battery modules to be able to be carried out in an expedient manner. It is a further object of the invention to make available a battery module assembly that can be operated in a variety of conditions and that provides protection against a plurality of different environmental conditions that are present during an operation of the battery module assembly.

SUMMARY

The objects of providing a simply manufactured, modular, cost-effective, repairable, environmentally protected battery module assembly comprising a plurality of battery modules that can be actively cooled within the battery module assembly are satisfied in accordance with the invention by a battery module assembly having the features of claim 1.

Such a battery module assembly comprises a plurality of battery modules each comprising battery cells, with the battery modules being arranged at respective positions in at least one row and respectively having a top side at which electric contacts are provided in order to connect the plurality of battery modules to form a power supply and a bottom side, the battery module assembly further comprising a housing and a cooling plate arranged between the housing and the bottom sides of the plurality of battery modules, wherein the cooling plate comprises a plurality of separate cooling passages and wherein the cooling plate is thermally attached to the plurality of battery modules by arranging the cooling plate in between said battery modules and a separate support plate.

By thermally attaching the cooling plate to the plurality of battery modules the heat conducting connection to the battery modules can be maintained at all times in a reliable manner. The heat from the battery modules can be conducted away via the cooling plate. Alternatively it would also be possible to use the cooling plate as a heating plate if the battery module assembly takes place in very cold environments. The separate support plate can support the cooling plate and/or the battery modules.

Such a thermal attachment can take place by clamping the battery modules to the cooling plate. Alternatively a heat conducting paste with adhesive properties could be placed between the bottom sides of the battery modules and the cooling plate to fix the cooling plate to the battery modules.

Arranging the battery modules in at least one row permits a modular arrangement of the battery modules within the housing.

Arranging a common cooling plate for the plurality of battery modules between a bottom side of the battery modules and the housing means that an active cooling can take place within the housing, with the cooling taking place at that side of the battery modules that is remote from the electrical contacts. Moreover, on a repair or maintenance of the battery module assembly, the battery modules are easily accessible as the main part of a cooling system, i.e. the cooling plate is arranged at the bottom of the housing, so that the battery modules can be accessed in a simple manner by simply removing a top housing part, such as a cover.

Moreover, a cooling plate that comprises a plurality of cooling passages can be actively cooled by a coolant. Moreover, a cooling effect of the coolant can be distributed over large areas of the cooling plate ensuring a homogenous distribution of the cooling effect of the coolant.

It should be noted in this connection that the cooling passages are configured to conduct a liquid coolant such as the ones commonly used in the automotive sector.

Preferably, a heat conducting gap filling material is provided directly between the bottom sides of the plurality of battery modules and the cooling plate. In this way the cooling performance of the cooling plate can be improved as the typically lower temperature of the cooling plate can be conducted better to the battery modules. It should be noted in this regard that the cooling plate can also be used for heating the battery modules if these are operated in very cold environments.

In this connection it should be noted that, due to manufacturing tolerances, the bottom side of the battery modules is not necessarily even, but may comprise gaps between battery cells or between the battery cells and the bottom side of the battery module. By appropriately selecting the type of heat conducting gap filling material used even large gaps can be bridged ensuring an ideal cooling of battery cells, even if these do not extend completely down to the bottom side of a battery module.

It is preferred if the plurality of separate cooling passages are guided from a front side of the cooling plate to a rear side of the cooling plate and back to the front side of the cooling plate, the plurality of cooling passages thereby form groups of cooling circuits.

By transporting the coolant to and fro between the front side and the rear side in groups of cooling circuits, a temperature difference across the cooling plate can be minimized and at best lies within the range of 0 to 1.5° C. In this way a battery module assembly can be made available in which the battery modules can be operated close to and preferably at the ideal operating temperature. This is particularly advantageous with respect to fast charging cycles where heat has to be conducted away from the battery modules in an expedient manner.

The cooling plate preferably further comprises a distributor arranged at the front side of the cooling plate for distributing a coolant, preferably a liquid coolant, into the plurality of cooling passages and a collector arranged at the front side of the cooling plate for collecting used coolant from the plurality of cooling passages. The use of a distributor and a collector respectively provides a simple but accurate way of distributing and collecting the coolant that is used in the battery module assembly. Moreover, only one component has to respectively be connected to the cooling plate whereas if individual supplies are chosen the number of contacts is increased increasing the cost of manufacture of the battery module assembly.

Preferably the distributor and the collector are arranged in a common manifold. The use of a common further reduces the cost of manufacture of a battery management assembly.

Advantageously the cooling plate is a metal cooling plate selected from the group of members consisting of a brazed cooling plate, a soldered cooling plate, a laser welded cooling plate and a roll bonded cooling plate, and preferably is an aluminum cooling plate or an aluminum alloy cooling plate. Such cooling plates have the cooling passages formed directly within and hence provide an improved cooling performance.

Preferably each row of battery modules is associated with its own cooling circuit group, preferably wherein each cooling circuit group has the same number of cooling passages. Providing a cooling circuit group for each row of battery modules means that a group is provided per row and in the event that one battery module is overheating e.g. due to a defective battery cell, the other battery modules arranged in different rows can still be operated close to the ideal operating efficiency due to their independent cooling.

Advantageously each cooling circuit group has a common inlet and a common outlet respectively connected to the distributor and to the collector. Forming a common inlet and outlet respectively for each group of cooling passages simplifies the distribution and collection of coolant and because less outlets and inlets are used. The use of fewer inlets and outlets respectively also reduces the number of potential leaks present within a battery module assembly.

It is preferred if the collector is arranged substantially in parallel to the front side of the cooling plate and to the distributor and/or wherein the distributor is arranged further away from the front side of the cooling plate than the collector.

In a preferred embodiment, the cooling plate is clamped to the plurality of battery modules. By clamping the cooling plate to the plurality of battery modules the heat conducting connection to the battery modules can be maintained at all times in a reliable manner.

Preferably the cooling plate is clamped to the plurality of battery modules via a separate support plate. Using a support plate to clamp the cooling plate to the battery modules means that a more uniform force can be applied onto the cooling plate during the clamping.

It should be noted in this connection that if a metal cooling plate is used, then the use of a support plate is generally advisable. This is because e.g. a roll bonded plate is formed by using two metal alloy plates of different hardness and on directly clamping these two combined plates forming the cooling plate, the difference in hardness between the two metal alloy plates can cause the cooling plate to deform in the region of the direct clamping.

Advantageously at least one layer of foam, preferably a support foam, is provided between the cooling plate and the separate support plate, wherein one layer of foam is preferably provided per row of battery modules. The layer of foam supports the cooling plate and further ensures that a uniform force is applied to the cooling plate for clamping this to the plurality of cooling modules. It further enables the dissipation of any external forces that may be introduced into the housing of the battery module assembly.

Preferably the support plate comprises fastener elements, for example in the form of press-in nuts or studs, there being threaded fasteners which extend from the support plate through the cooling plates and through corner regions of the plurality of battery modules in order to clamp the cooling plate between the support plate and the plurality of battery modules thereby fixing the plurality of battery modules relative to the support plate.

The use of fastener elements that are directly integrated into the support plate, such as press-in nuts or studs, reduces the number of components that are loose within the housing. Moreover, having assembly components fixed in position makes the assembly and disassembly of a battery module assembly more efficient. Moreover, a pre-manufactured support plate can be used which also reduces the cost of manufacture of the assembly.

It is preferred if an insulating layer is arranged between the housing and the support plate, this insulating material can then form a lower layer of thermal insulation by means of which the temperature within the battery module assembly can be controlled in an improved manner.

The insulating layer preferably comprises cut outs for at least part of the fastener elements projecting beneath the support plate. In this way a more compact design is made available, as the height of the insulating layer can be reduced by a height of the cut outs.

The battery module assembly advantageously further comprises a main contactor assembly that is arranged at one of the positions in the at least one row of the plurality of battery modules within the housing. Incorporating the main contactor assembly within the housing and preferably on the cooling plate has the advantage that this can also be maintained at one temperature and can be shielded from external influences such as temperature and humidity.

In a further aspect the present invention relates to a cooling plate for use in a battery module assembly in accordance with the teaching presented herein. The advantages associated with the battery module assembly likewise hold true for the cooling plate.

BRIEF DESCRIPTION OF THE DRAWINGS

The invention will be described in detail by means of embodiments and with reference to the drawings. The features described may be configured in various combinations, which are encompassed by this document. In the drawings.

DETAILED DESCRIPTION

The following detailed description is merely exemplary in nature and is not intended to limit the invention or the application and uses of the invention. Furthermore, any expression relating to direction or position in this application is made relative to the position of installation and/or to the position in the Figures.

Figure 1:
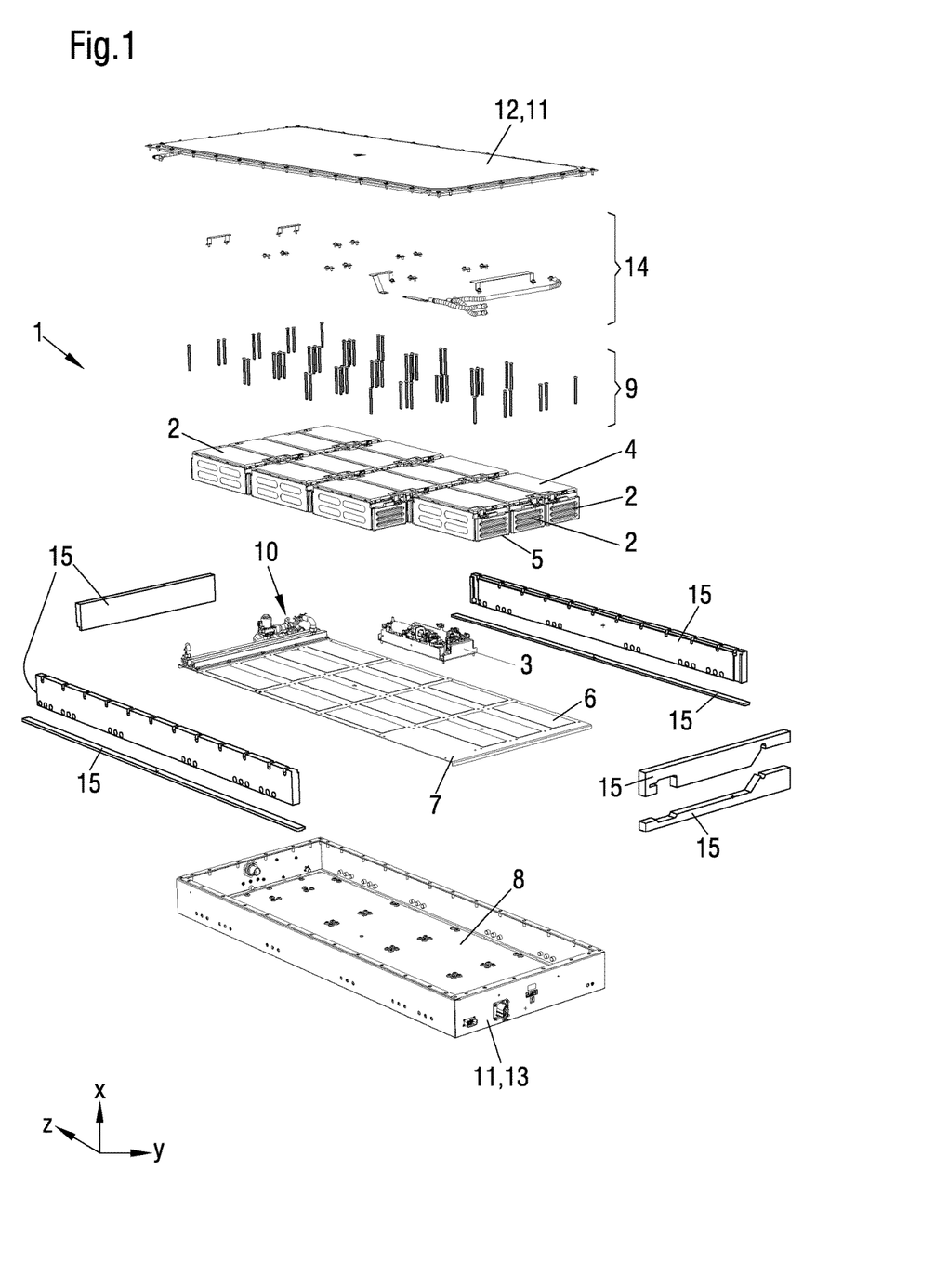
FIG. 1 is an exploded schematic view of a battery module assembly.

FIG. 1 shows an exploded schematic view of a battery module assembly 1. The battery module assembly 1 comprises a plurality of battery modules 2 each comprising battery cells (not shown). The battery modules 2 are arranged at respective positions in four rows and in four columns. Presently fifteen battery modules 2 are arranged in the housing with a main contactor assembly 3 being provided at the remaining sixteenth position of the rows and columns. The X, Y and Z directions of the battery module assembly 1 are also indicated.

The battery modules 2 each have a top side 4 at which electric contacts (not shown) are provided in order to connect the plurality of battery modules 2 to one another to form a power supply. In this connection the plurality of battery modules 2 can be connected to one another in parallel and/or in series. For example, groups of five battery modules 2 connected to one another in series could be connected to one another in parallel.

The battery modules 2 each have a bottom side 5 at which ends (not shown) of the battery cells are freely accessible. The bottom side 5 of each batter module 2 is arranged on top of a heat conducting gap filling material 6. The heat conducting gap filling material 6 is sandwiched between the bottom sides 5 of the battery modules 2 and a cooling plate 7.

Moreover, any gaps present between the ends of the plurality of battery cells that are accessible from the bottom side 5 and the bottom side and hence between the battery cells and the cooling plate 7, can be bridged by the heat conducting gap filling material 6 ensuring that a cooling made available via the cooling plate 7 can be conducted as efficiently as possible to the battery cells of the battery modules 2 via the heat conducting gap filling material 6. The heat conducting gap filling material 6 hence facilitates a thermal attachment of the cooling plate 7 to the bottom sides 5 of the battery modules.

The cooling plate 7 is clamped to the battery modules 2 via a separate support plate 8 and a plurality of bolts 9. A coolant distributing and collecting circuit 10 is arranged at the cooling plate 7 for distributing and collecting coolant into the liquid cooled cooling plate 7. The liquid cooled cooling plate 7 shown in FIG. 1 is formed in a roll bonding process. By clamping the cooling plate 7 to the battery modules 2 the thermal attachment of the cooling plate 7 to the bottom sides 5 of the battery modules can be enhanced.

It should be noted that the liquid cooled cooling plate 7 could alternatively be formed in a soldering process, a laser welding process or a brazing process.

The battery modules 2, the main contactor assembly 3, the cooling plate 7 and the support plate 8 are all accommodated in a housing 11 having a top housing part 12 and a bottom housing part 13. A high voltage assembly group 14 is arranged between the top sides 4 of the battery modules 2 and the top housing part 12 in order to electrically connect the battery modules 2 to one another.

In order to thermally insulate the components present in the housing 11 insulating material 15 is provided that is arranged in the housing 11 such that it lines inner surfaces of the housing 11.

The insulating material 15 preferably also has shock absorbing properties such that in use e.g. in electric vehicles a damping means is also provided to protect the battery modules 2 from external forces.

A non-shown fire protective material can also be included in the housing 11 of the battery module assembly. This can be arranged between individual battery modules 2 in order to prevent a flashover between battery modules in the event of a battery cell catching fire.

The bottom housing part 13 can e.g. be connected to various kinds of vehicles as part of a power supply thereof via brackets (not shown) or the like.

Figure 2:
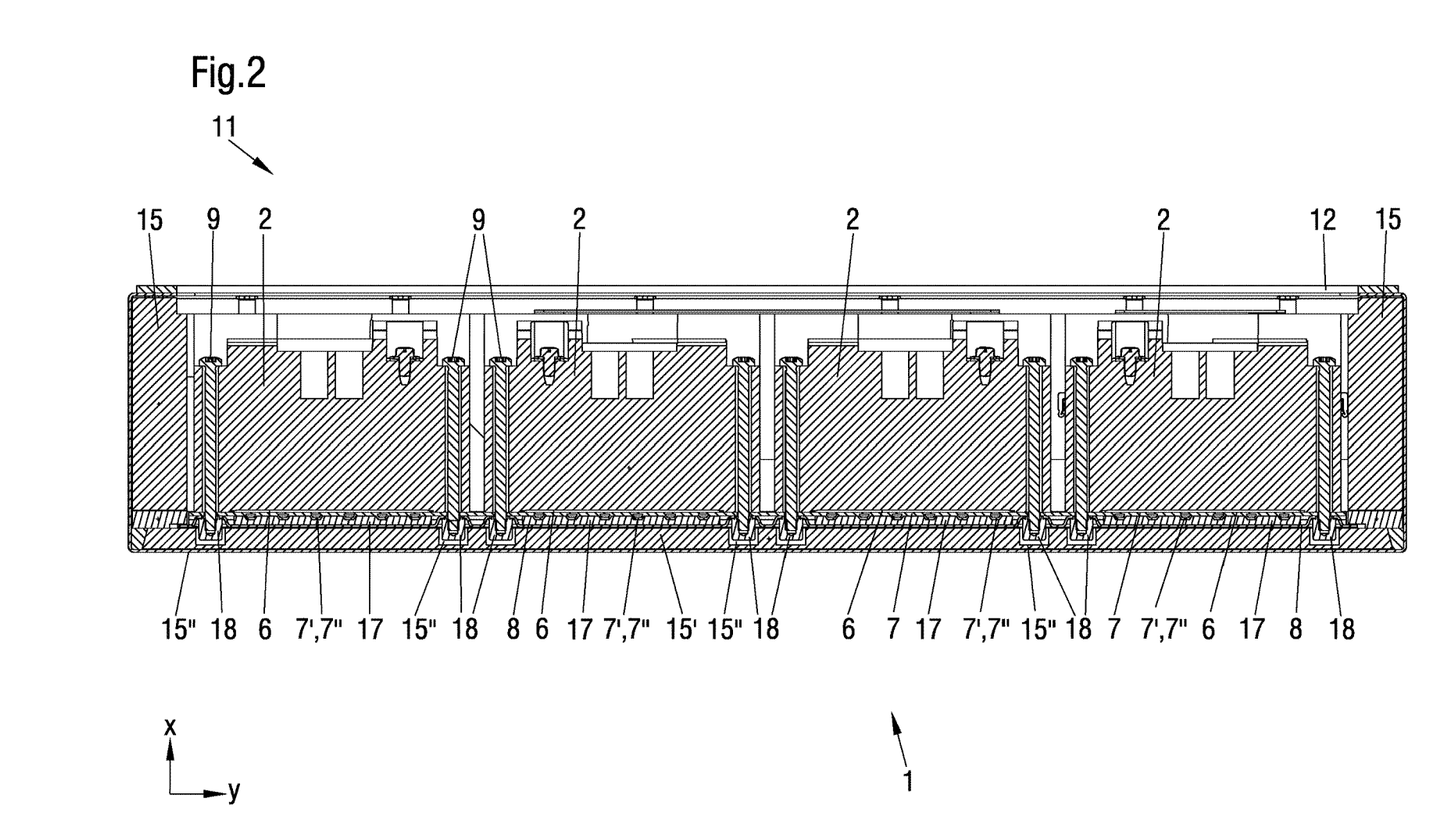
FIG. 2 is a section through the assembled battery module assembly of FIG. 1 taken in the plane of the y-direction.

FIG. 2 shows a schematic section (not to scale) through the assembled battery module assembly 1 of FIG. 1 taken in the plane of the y-direction. Each row of battery modules 2 is associated with its own cooling circuit group 7' composed of a plurality of cooling passages 7" which are formed within the cooling plate 7.

In order to reliably clamp the cooling plate 7 having the cooling passages 7" formed therein to the battery modules 2, a layer of foam 17 is provided between the cooling plate 7 and the separate support plate 8 for each row of battery modules 2. The layer of foam 17 prevents the cooling passages 7" of the cooling plate 7 from being damaged by the support plate 8. Hence the layer of foam 17 is a supporting of material. The layer of foam 17 could be present in the form of a layer of support foam.

The battery modules 2 are respectively clamped to the support plate 8 by means of the bolts 9 that engage fastener elements 18 that are present in the form of press-in nuts 18.

The fastener elements 18 could likewise be formed by studs (not shown) that project from the support plate and which cooperate with respective nuts in order to clamp the battery modules 2 to the support plate 8 and hence bring about the heat conducting contact to the cooling plate 7.

Regardless of the type of fastener element 18 used, these extend through corner regions of the plurality of battery modules 2 in order to clamp the cooling plate 7 between the support plate 8 and the plurality of battery modules 2, thereby fixing the plurality of battery modules 2 relative to the support plate 8.

An insulating layer of insulating material 15' is arranged between the bottom housing part 13 and the support plate 8. The insulating layer 15' comprises cut outs 15" for the fastener elements 18 projecting beneath the support plate 8. The insulating layer 15' is formed from the same or similar material as the insulating material 15.

In the presently shown embodiments it is a porous hard foam layer that provides thermal insulation and that has shock absorbing properties. The insulating material 15 forming the insulating layer 15' and/or the various other liners can, however, be a different kind of material that makes available the required thermal insulating properties and damping properties.

The presently shown battery module assembly 1 has a length in the z-direction of 1.8 m, a width in the y-direction of 0.8 m and a height in the x-direction of 0.22 m.

The typical outer dimensions of housings 11 for such battery module assemblies can be selected with lengths in the z-direction of 0.4 m to 5 m, with widths in the y-direction of 0.2 m to 2 m, and with heights in the x-direction of 0.15 m to 0.8 m. Such battery module assemblies 1 then respectively comprise different numbers of battery modules 2.

The battery modules 2 do not necessarily have to have a rectangular base shape, but can be of any arbitrary design, for example round or triangular shapes are plausible. If battery modules 2 with different designs of the base shape are selected, then the size of the housing 11 and of the cooling plate 7 is typically adapted to that shape of battery module 2.

Figure 3:
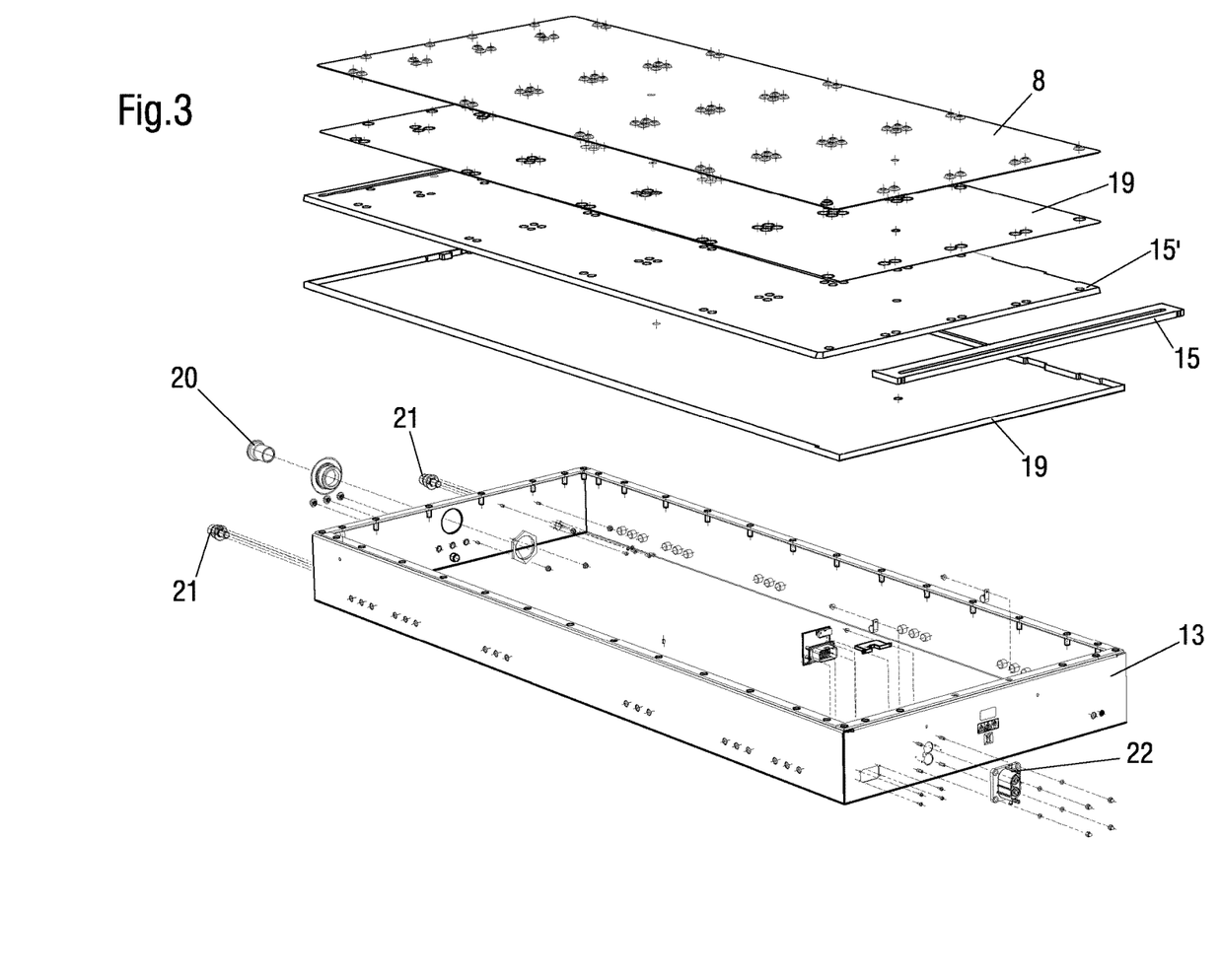
FIG. 3 is an exploded view of a bottom housing part of the battery module assembly of FIG. 1.

FIG. 3 shows an exploded view of the bottom housing part 13 of the battery module assembly 1. The support plate 8 is adhesively connected to the insulating layer 15' comprising the cut outs 15" by means of a first adhesive layer 19. The insulating layer 15' comprising the cut outs 15" is adhesively connected to a base plate of the bottom housing part 13 by means of a second adhesive layer 19. In order to align these different layers with respect to one another centering pins (not shown) are used.

As the housing 11 is a liquid cooled housing 11 the humidity within the housing 11 needs to be regulated. For this purpose the housing 11 further comprises humidity regulating means 20.

In the present instance the humidity regulating means 20 are screwed into the housing 11 at an end thereof and are formed by a dry cartridge. Different designs of humidity regulating means 20 (not shown) are however also plausible.

The bottom housing part 13 further comprises coolant connectors 21 for introducing and removing coolant into the liquid cooled housing 11. In order to extract the high voltage from the battery module assembly 1, a high voltage connector 22 is provided that is arranged at the end of the housing 11 remote from the end having the coolant connectors 21. A separate piece of insulating material 15 is also provided at the end of the housing 11 having the high voltage connector 22.

Figure 4A:
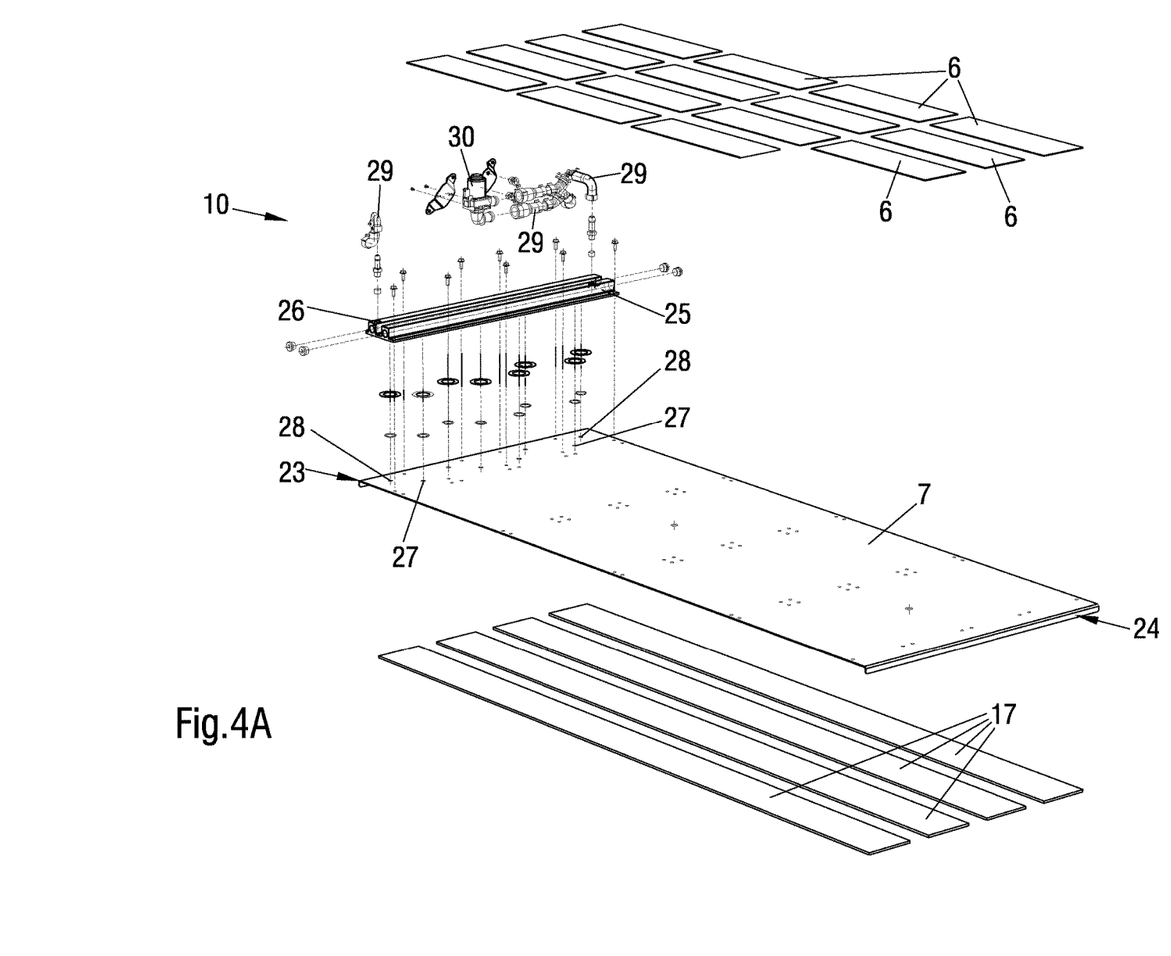
FIG. 4A is a first exploded view of cooling components of the battery module assembly of FIG. 1.

FIG. 4A shows an exploded view of cooling components of the battery module assembly 1. The cooling plate 7 comprises a plurality of separate cooling passages 7" that are guided from a front side 23 of the cooling plate 7 to a rear side 24 of the cooling plate 7 and back to the front side 23 of the cooling plate 24. In this way the plurality of cooling passages 7" form the groups of cooling circuits 7'.

In order to supply the respective cooling passages 7" of each cooling circuit group with a coolant (not shown), the cooling plate 7 further comprises a distributor 25 arranged at the front side 23 of the cooling plate 7 for distributing the liquid coolant into the plurality of cooling passages 7". In order to collect the coolant the cooling plate 7 further comprises a collector 26 also arranged at the front side 23 of the cooling plate 7 for collecting used coolant from the plurality of cooling passages 7".

Each row of battery modules 2 is associated with its own cooling circuit group 7' and each cooling circuit group 7' has the same number of cooling passages 7". Each cooling circuit group 7' has a common inlet 27 and a common outlet 28 respectively connected to the distributor 25 and to the collector 26.

The collector 26 is arranged substantially in parallel to the front side 23 of the cooling plate 7 and to the distributor 25, with the distributor 25 being arranged further away from the front side 23 of the cooling plate 7 than the collector 26.

By arranging the cooling passages 7" such that their inlets 27 and outlets 28 are arranged at the same side of the cooling plate 7, a cooling plate 7 is made available that has at least substantially the same cooling temperature for each row of battery modules 2, i.e. for each cooling circuit group 7', as the temperature gradient across the different cooling circuit groups 7', the bottom sides 5 of the battery modules 2 and the cooling plate 7 is essentially maintained within the range of 0 to 1.5° C.

This low difference across the cooling plate 7 is achieved thereby that the inlets 27 and outlets 28 of the cooling passages 7" are provided at the same end of the cooling plate 7, such that a same average temperature is set for the cooling passages 7" of a cooling circuit group 7'.

The provision of a cooling plate 7 having a temperature gradient within this range means that all of the battery cells present within the battery module assembly 1 can be operated close to or at the optimum temperature thereby significantly increasing the performance of such a battery module assembly 1.

In this connection it should be noted that the cooling plate 7 is a metal cooling plate 7, preferably an aluminum cooling plate 7 or an aluminum alloy cooling plate 7. Such cooling plates 7 can withstand pressures of up to 5 bar, at least momentarily. In the present example the cooling plate 7 is 70 cm wide in the y-direction and 170 cm long in the z-direction.

Metal cooling plates 7, such as roll bonded metal cooling plates, are typically produced from two different types of aluminum alloy of different hardness that are bonded to one another and into which, due to the difference in hardness, the cooling passages 7" are formed. The cooling passages 7" can have lengths of up to 2 m for average diameters in the range of 0.5 to 2.5 mm. In the present instance a diameter of 1.7 mm is present for each cooling passage 7".

As can further be seen from FIG. 4A, fifteen pieces of heat conducting gap filling material 6 are provided per battery module 2, i.e. a piece of heat conducting gap filling material 6 is provided per battery module 2. The provision of heat conducting gap filling material 6 in the region of the control unit 3 is not necessarily required as this can be provided with a flat planar housing 33 (see FIG. 5B) ensuring an almost ideal contact between the housing 33 of the control unit 3 and the cooling plate 7.

Figure 4B:
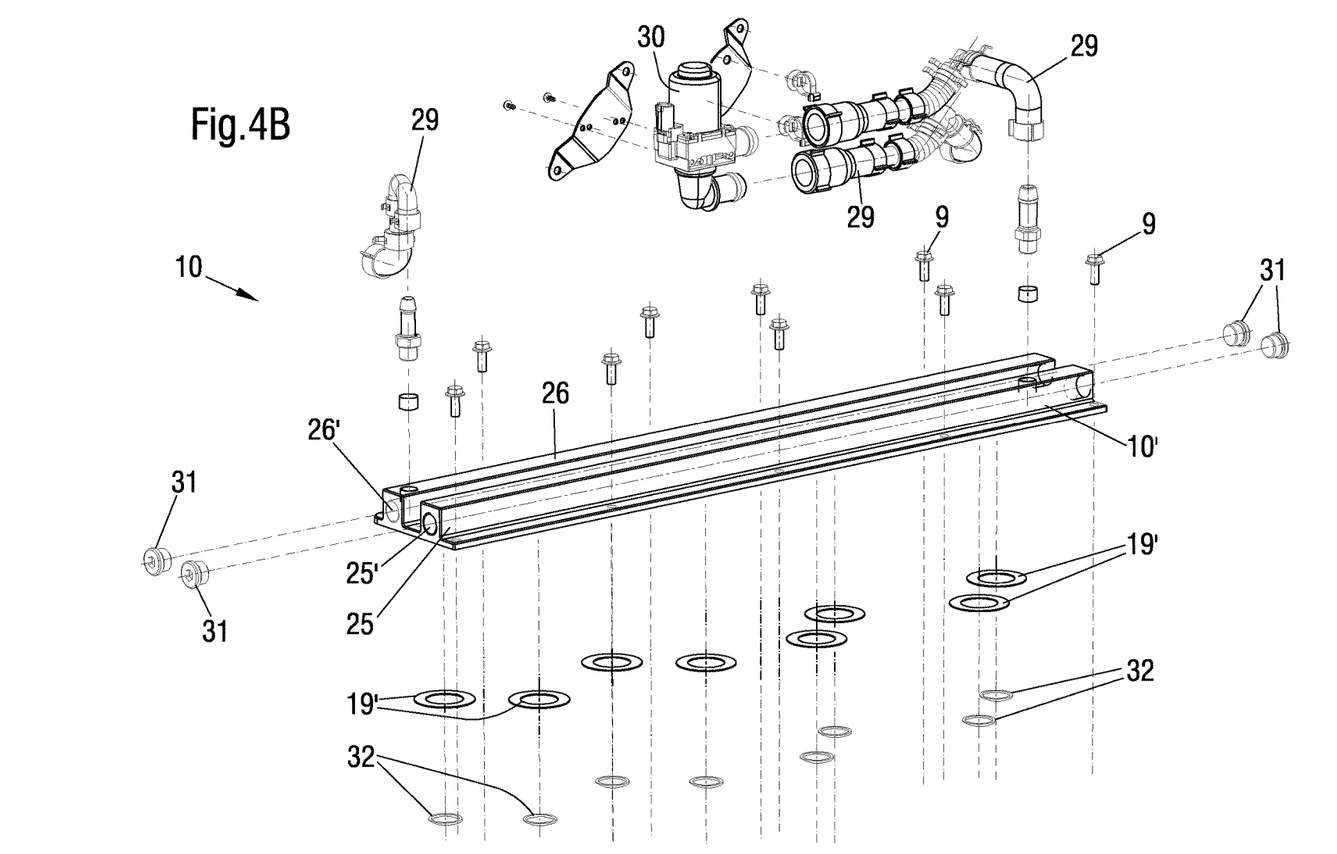
FIG. 4B is a second exploded view of cooling components of the battery module assembly of FIG. 1.

FIG. 4B shows a detailed view of the components of the coolant distributing and collecting circuit 10. A common manifold 10' is visible that houses both the distributor 25 and the collector 26. The coolant is fed to and guided away from the manifold 10' via hoses 29. A cut off valve 30 is connected to the hoses 29 leading to the distributor 26 in order to cut off a supply of coolant to the manifold 10'.

The manifold 10' is a section of extruded material in order to enable a cost effective manufacture thereof. In order to seal the respective ends of the channels 25', 26' forming part of the distributor 25 and the collector 26 plugs 31 are provided that are introduced into the channels 25', 26'.

The manifold 10' is connected to the cooling plate 7 by means of bolts 9. In order to ensure that leaks are avoided between the manifold 10', seals 32 are provided between the cooling plate 7 and the manifold 10' in the region of the inlets 27 and the outlets 28. The seals 32 are present in the form of O-rings. An adhesive element 19' is further provided that ensures that the seal is bonded correctly between the cooling plate 7 and the manifold 10'.

Figure 5A:
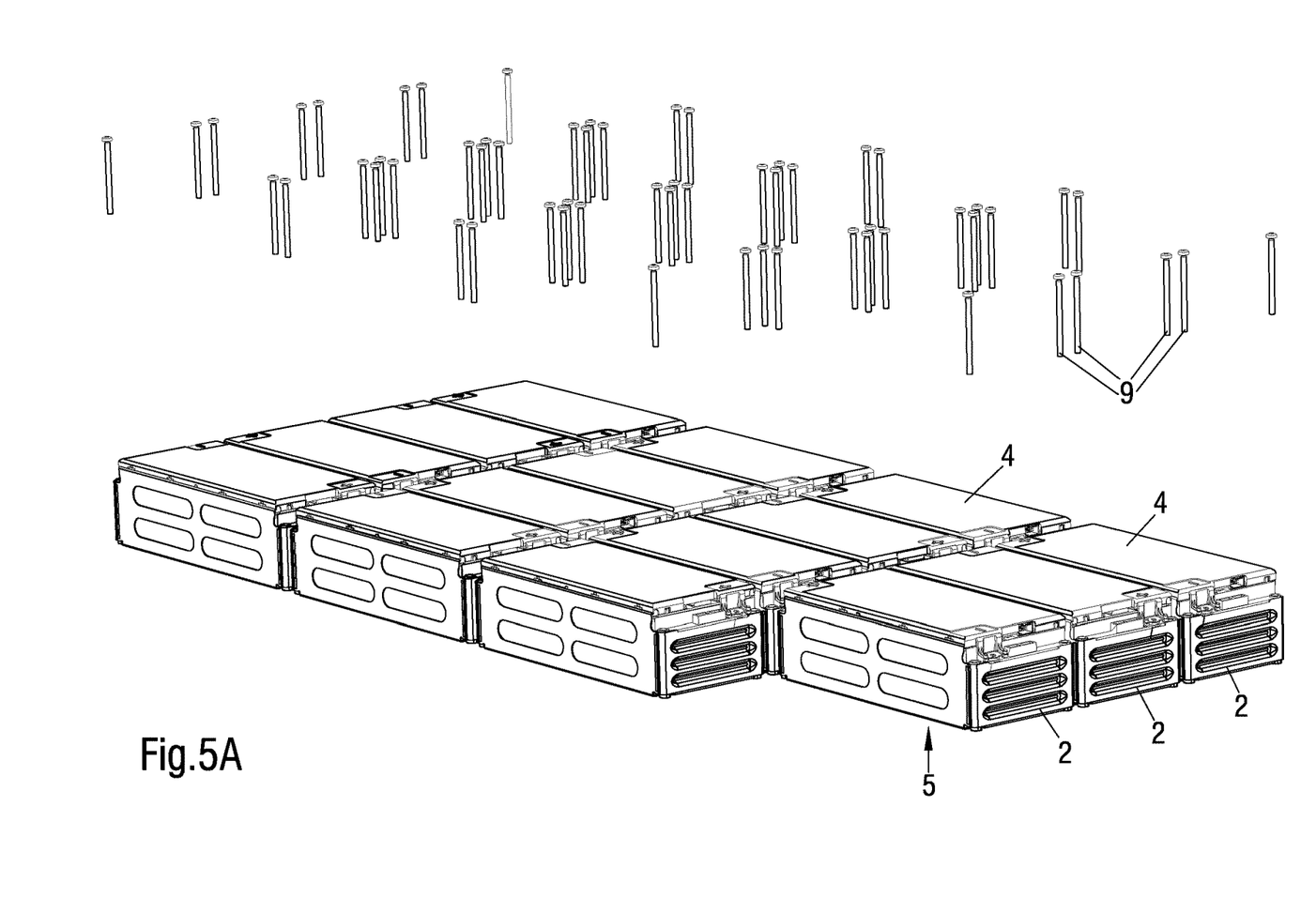
FIG. 5A is a first exploded view of battery modules and of a main contactor assembly of the battery module assembly of FIG. 1.

FIG. 5A shows an exploded view of the battery modules 2 and their arrangement in rows and columns, with one position remaining free. The main contactor assembly 3 is placed at this position within the housing 11 (see FIG. 1). The battery modules 2 shown comprise 12 prismatic cells of the standard PHEV2 as are commonly used in the automotive industry. Such modules comply with the standards put forward by the VDA, i.e. the "Verband der Automobilindustrie" (the German Association of the Automotive Industry). Each battery cell has an output voltage of 3.7 V such that the battery modules 2 each have an output voltage of 44.4 V. By connecting 15 of such modules in series an output voltage of 666 V can be achieved, such voltages are sufficient to power an electrically driven bus, for example.

The battery modules 2 are non-cooled and for this reason require an external cooling in order to sure the best possible thermal operating conditions. The battery modules each deliver the same output voltage of approximately 44.4V. The top sides 4 of the battery modules 2 each comprise temperature and voltage sensors (not shown), by means of which the state of each battery cell can be monitored. The signals output by the temperature and voltage sensors, like the voltage output, are respectively fed to the main contactor assembly 3 using specific cables (not shown).

Figure 5B:
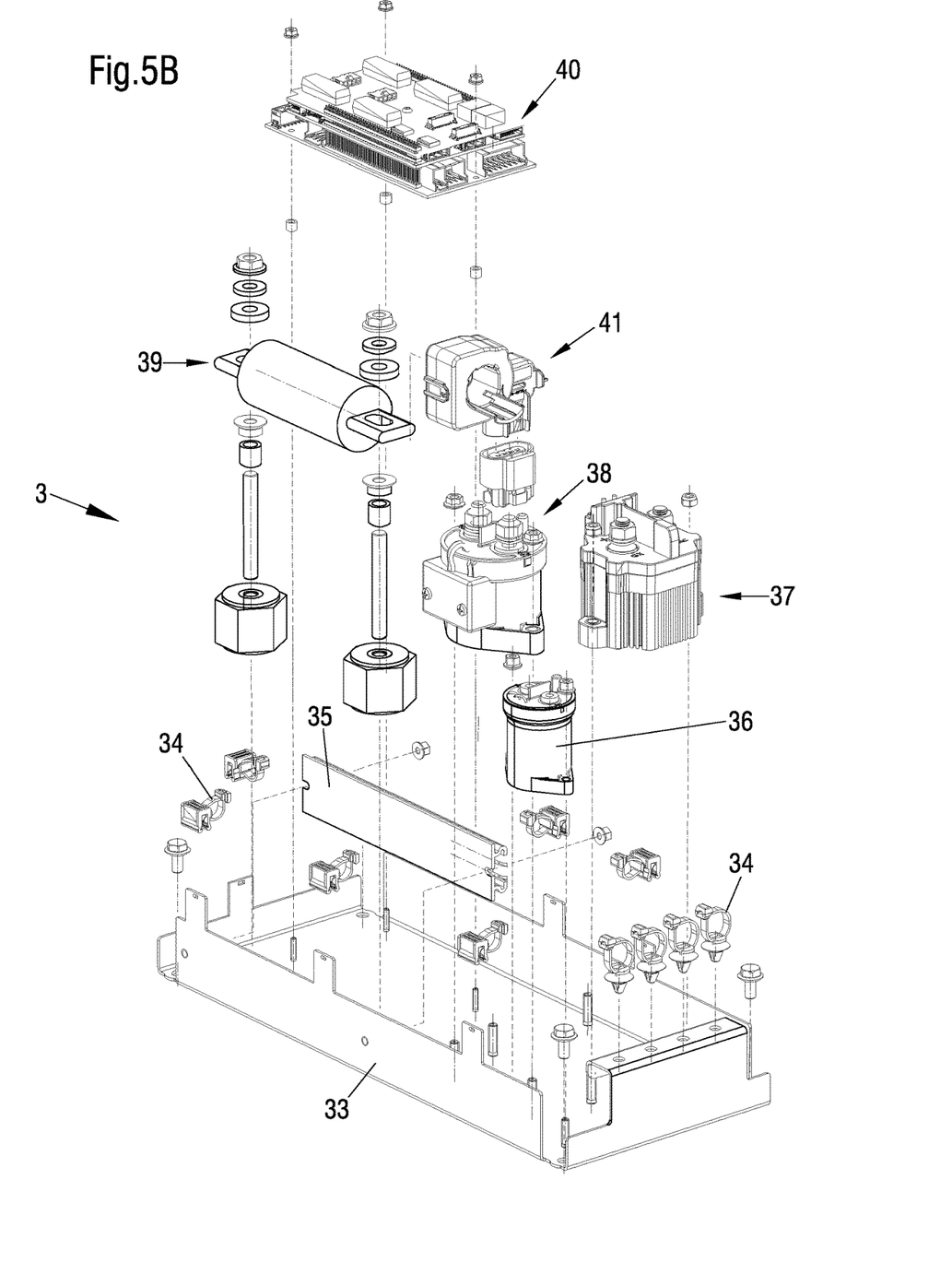
FIG. 5B is a second exploded view of battery modules and of a main contactor assembly of the battery module assembly of FIG. 1.

FIG. 5B shows an exploded view of the main contactor assembly 3. The components of the main contactor assembly 3 are accommodated in the housing 33 that is designed to occupy the free position in one of the rows provided in the housing 11 of the battery module assembly 1. The components are affixed to the housing 33 by means of cable ties 34. The components of the main contactor assembly 3 comprise a pre-charging resistor 35, a pre-charging contactor 36, a negative main contactor 37, a positive main contactor 38, a fuse 39, a current sensor 41 and a battery monitoring unit 40.

By placing the main contactor assembly 3 within the housing 11 and on the cooling plate 7 this can likewise be cooled and hence its performance is improved particularly in warm environments.

The housing 11 shown with respect to the FIGS. 1 to 5B is formed by welding different sidewalls to one another and by bolting the top housing part 12 to the bottom housing part 13.

LIST OF REFERENCE NUMERALS 1 battery module assembly
2 battery module
3 main contactor assembly
4 top side
5 bottom side
6 heat conducting material
7 cooling plate
7' cooling circuit group
7" cooling passage
8 support plate
9 bolts
10 coolant distributing and collecting circuit
10' manifold
11 housing
12 top housing part
13 bottom housing part
14 high voltage assembly group
15 insulating material
15' insulating layer
15" cut out for a fastener element
17 layer of foam
18 fastener element, press-in element
19 adhesive layer
19' adhesive ring
20 humidity regulating means
21 coolant connectors
22 HV connectors
23 front side
24 rear side
25 distributor
25' channel
26 collector
26' channel
27 inlet
28 outlet
29 hose
30 cut off valve
31 plug
32 seal
33 housing
34 cable ties
35 pre-charging resistor
36 charging contactor
37 main contactor negative
38 main contactor positive
39 fuse
40 battery monitoring unit
41 current sensor
X direction
Y direction
Z direction

The invention claimed is:

1. A battery module assembly comprising a plurality of battery modules each comprising battery cells, with the battery modules being arranged at respective positions in at least one row and respectively having a top side at which electric contacts are provided in order to connect the plurality of battery modules to form a power supply and a bottom side, the battery module assembly further comprising a housing and a cooling plate arranged between the housing and the bottom sides of the plurality of battery modules, wherein the cooling plate comprises a plurality of separate cooling passages, and wherein the cooling plate is thermally attached to the plurality of battery modules by arranging the cooling plate in between said battery modules, wherein the cooling plate is clamped to the plurality of battery modules via and a separate support plate, wherein the cooling plate further comprises a distributor arranged at a front side of the cooling plate for distributing a coolant into the plurality of cooling passages and a collector arranged at the front side of the cooling plate for collecting used coolant from the plurality of cooling passages.

2. The battery module assembly in accordance with claim 1, wherein the plurality of separate cooling passages are guided from the front side of the cooling plate to a rear side of the cooling plate and back to the front side of the cooling plate and the plurality of cooling passages thereby form groups of cooling circuits.

3. The battery module assembly in accordance with claim 2, wherein the plurality of cooling passages are configured to distribute a liquid coolant.

4. The battery module assembly in accordance with claim 1, wherein the cooling plate is a metal cooling plate selected from the group of members consisting of a brazed cooling plate, a soldered cooling plate, a laser welded cooling plate and a roll bonded cooling plate.

5. The battery module assembly in accordance with claim 4, wherein the cooling plate is an aluminum or aluminum alloy cooling plate.

6. The battery module assembly in accordance with claim 2, wherein each row of battery modules is associated with its own cooling circuit group.

7. The battery module assembly in accordance with claim 2, wherein each cooling circuit group has the same number of cooling passages.

8. The battery module assembly in accordance with claim 2, wherein each cooling circuit group has a common inlet and a common outlet respectively connected to the distributor and to the collector.

9. The battery module assembly in accordance with claim 2, wherein the collector is arranged substantially in parallel to the front side of the cooling plate and to the distributor.

10. The battery module assembly in accordance with claim 2, wherein the distributor is arranged further away from the front side of the cooling plate than the collector.

11. The battery module assembly in accordance with claim 1, wherein the cooling plate is clamped to the plurality of battery modules via the separate support plate.

12. The battery module assembly in accordance with claim 1, wherein at least one layer of foam is provided between the cooling plate and the separate support plate.

13. The battery module assembly in accordance with claim 12, wherein one layer of foam is provided per row of battery modules.

14. The battery module assembly in accordance with claim 1, wherein the separate support plate comprises fastener elements, there being threaded fasteners which extend from the support plate through the cooling plates and through corner regions of the plurality of battery modules in order to clamp the cooling plate between the support plate and the plurality of battery modules thereby fixing the plurality of battery modules relative to the support plate.

15. The battery module assembly in accordance with claim 14, wherein the fastener elements are present in the form of press-in nuts or studs.

16. The battery module assembly in accordance with claim 1, further comprising an insulating layer arranged between the housing and the support plate.

17. The battery module assembly in accordance with claim 14, further comprising an insulating layer arranged between the housing and the support plate, with the insulating layer comprising cut outs for at least part of the fastener elements projecting beneath the support plate.

18. The battery module assembly in accordance with claim 1, further comprising a main contactor assembly that is arranged at one of the positions in the at least one row of the plurality of battery modules within the housing.

19. The battery module assembly in accordance with claim 1, wherein a heat conducting gap filling material is provided directly between the bottom sides of the plurality of battery modules and the cooling plate.

20. A cooling plate for use in a battery module assembly, the battery module assembly comprising a plurality of battery modules each comprising battery cells, with the battery modules being arranged at respective positions in at least one row and respectively having a top side at which electric contacts are provided in order to connect the plurality of battery modules to form a power supply and a bottom side, the battery module assembly further comprising a housing and a cooling plate arranged between the housing and the bottom sides of the plurality of battery modules, wherein the cooling plate comprises a plurality of separate cooling passages, and wherein the cooling plate is thermally attached to the plurality of battery modules by arranging the cooling plate in between said battery modules and a separate support plate, wherein the cooling plate further comprises a distributor arranged at a front side of the cooling plate for distributing a coolant into the plurality of cooling passages and a collector arranged at the front side of the cooling plate for collecting used coolant from the plurality of cooling passages.

* * * * *